May 26, 1964 K. RÄNTSCH ET AL 3,134,838
OPTICAL APPARATUS FOR ACCURATELY SETTING AND READING THE DISPLACEMENT OF SLIDE CARRIAGES
Filed Feb. 9, 1960 11 Sheets-Sheet 1

INVENTORS
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

May 26, 1964 K. RÄNTSCH ETAL 3,134,838

OPTICAL APPARATUS FOR ACCURATELY SETTING AND READING THE DISPLACEMENT OF SLIDE CARRIAGES

Filed Feb. 9, 1960 11 Sheets-Sheet 3

INVENTORS

KURT RÄNTSCH

ADOLF WEYRAUCH

BY Toulmin & Toulmin

ATTORNEYS

INVENTORS
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

INVENTOR
KURT RÄNTSCH
ADOLF WEYRAUCH
BY Toulmin & Toulmin
ATTORNEYS

INVENTORS
KURT RÄNTSCH
ADOLF WEYRAUCH
BY Toulmin & Toulmin
ATTORNEYS

INVENTORS
KURT RANTSCH
ADOLF WEYRAUCH
BY Toulmin & Toulmin
ATTORNEYS 3,134,838
Patented May 26, 1964

3,134,838

OPTICAL APPARATUS FOR ACCURATELY SETTING AND READING THE DISPLACEMENT OF SLIDE CARRIAGES

Kurt Räntsch and Adolf Weyrauch, Wetzlar (Lahn), Germany, assignors to M. Hensoldt & Söhne, Optische Werke, AG, Wetzlar (Lahn), Germany Filed Feb. 9, 1960, Ser. No. 7,585
Claims priority, application Germany Feb. 11, 1959
24 Claims. (Cl. 88—14)

The present invention relates to an optical apparatus for adjusting and reading the displacement of a carriage, for example a cross slide. More in particular, the present invention relates to an optical apparatus for adjusting and reading the displacement of the carriage in machines, particularly tool machines, measuring apparatus and the like.

Measuring apparatus or machines, such as machine tools, frequently have a fixed and a moveable portion, with a scale being mounted in the fixed portion and a reading device provided in the moveable portion, or vice versa. It is known to provide optical elements projecting a section of the scale on the graticule of the reading device. It is further known to provide compensating elements and to direct the imaging path of rays through these compensating elements for compensating guiding errors or inaccuracies, which guiding errors may cause the carriage to become tilted or slightly inclined. The compensating elements so direct the imaging path of rays that the image of the division stroke assumes its correct position on the graticule, in spite of the erroneous inclination of the carriage.

In practice this compensation is far from being satisfactory due to the fact that a full and accurate compensation by the optical compensating elements is accomplished only where the elements are so chosen that they correspond to a particular distance of the scale from the measuring axis or the plane in which the work piece is processed. As a matter of fact, this distance changes constantly as work pieces of various dimensions are passed through the machine tool and the consequent variation of the distance renders the compensation inaccurate. As a result, considerable measuring errors are obtained.

Hitherto it has not been possible to remove these great disadvantages as it was heretofore unknown to provide means for taking into account the varying distances of the scale from the measuring axis, varying with different work pieces of various dimensions.

With the foregoing in mind it is an object of the present invention to provide an optical apparatus for adjusting and reading the displacement of the carriage in machines or measuring apparatus which is provided with means fully and accurately compensating errors arising from inclinations of the carriage or other guiding errors.

It is a further object of the invention to provide an optical apparatus for adjusting and reading the displacement of the carriage in machines or measuring apparatus which guarantees accurate adjusting and reading operations even where the distance between the scale and the measuring axis varies.

These objects are achieved by the present invention which is based on the discovery that the optical elements in the apparatus of the invention must meet a number of conditions which we found can be expressed by the following general formula:

$$\sum_{i=1}^{n_1}\frac{du_i}{dw}\cdot\frac{h_i}{s'}+\sum_{k=1}^{n_2}\frac{dv_k}{dw}\cdot\frac{s_k}{s'}=a$$

In this general formula $a$ designates the distance between the scale and the measuring plane, the latter being identical with the surface plane of the work piece to be processed, for example by drilling, $du_1$ is the deflection of the light rays caused by the $i^{th}$ compensating element at an inclination of the slide carriage by the angle $w$; $h_i$ is the distance between a light ray leaving the $i^{th}$ compensating element and the optical axis; $s'$ is the angle formed by this light ray with the optical axis after the light ray leaves image-forming optical elements subsequent to the $i^{th}$ or $k^{th}$ elements; $dv_k$ designates the parallel displacement of a light ray relative to itself caused by the $k^{th}$ compensating element with an inclination of the slide carriage by the angle $w$; $s_k$ is the angle formed between the light ray leaving the $k^{th}$ compensating element and the optical axis; $n_1$ is the number of the compensating elements deflecting the light ray from its previous direction; $n_2$ is the number of the compensating elements displacing a light ray parallel relative to itself. Further below in this specification we shall describe how we have arrived at this general formula.

According to the invention the conditions of the aforementioned formula must be fulfilled and in addition, means are provided/adapted to change at least one of the values $du_i/dw$; $h_i/s'$; $dv_k/dw$; $s_k/s'$; $n_1$; $n_2$. The provision of such means makes it possible to so change one of the values of the equation that the conditions of the formula are met, whenever the distance of the work plane of the work piece from the plane of the scale is changed.

Such readjustment can be effected by various means and in different ways shown, by way of example, by a number of embodiments of the invention described further below. It is, for example, possible to vary the value $h_i/s'$ which represents the focal length of the optical system subsequent to the $i^{th}$ compensating element, provided that the $i^{th}$ compensating element is disposed in the parallel path of rays. The variation can be effected, for example, by means of an adjustable objective of variable focal length producing an image of the division strokes or points of the scale, or by changing the scale of reproduction. The focal length of the objective can be changed easily by providing an objective consisting of two lenses whose relative distance from each other can be varied.

It is also possible to vary the value $h_i/s'$ by changing the magnification in the image-forming system. This can be done particularly easily where a collimator is provided and an image of its reference mark is produced and superimposed on the image of the division stroke of the scale, the joint image then being viewed by a magnifying lens. The magnification can be easily changed by providing two adjustable lenses whose relative distance from each other can be varied.

A magnification can also be effected by providing Galilean systems which can be placed into or removed from the path of rays. The magnification produces a change of the width of the collimator mark; the magnification can be compensated by providing further Galilean systems which reduce the image to its normal size. The degree of magnification must be adapted to the desired work distance $a$.

In a further embodiment of the invention the change of magnification is shown by a pair of systems which can be pivoted about a shaft, vertically relative to the optical axis and which systems are inclined relative to each other by an angle of 180°. The displacement of the prisms can be controlled, for example, by means of a curved disk connected with the support of the tool for working the work piece.

Furthermore, it is also possible to vary the value $du_i/dw$ which represents the amount of deviation of light rays relative to a determined angle of inclination of the carriage; or the value $dv_k/dw$ can be changed, which represents the change of the amount of parallel displacement, depending on a determined angle of inclination of the carriage; or the value $s_k/s'$ can be changed, representing the magnifying effect behind the $k^{th}$ compensating element.

Further embodiments of the invention will be described with reference to the accompanying drawings, wherein FIGURE 1 is a schematic view of a first embodiment of the invention for varying the quotient $h_i/s'$;

Figure 13:
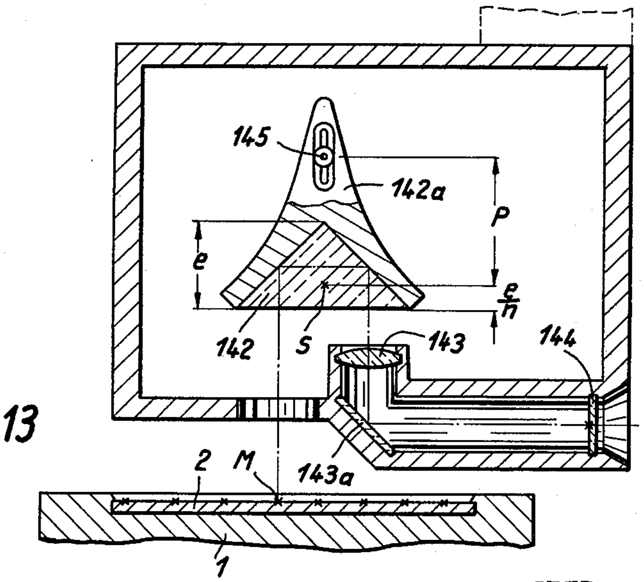
FIGURES 13 and 14 are schematic views of embodiments of the invention for varying $dv_k/dw$.

FIGURE 13$a$ is a schematic view showing the compensating element of FIGURE 13 in another position.

Before turning to the detailed description of the drawings, the afore-mentioned general formula will first be explained and in particular it will be explicated how we have arrived at this formula.

A few basic remarks will facilitate this explanation. If the slide carriage becomes tilted due to a guide error by an angle on inclination $w$, then $\Delta m = aw$, $\Delta m$ being the measuring error and $a$ the distance between the measuring scale and the measuring plane.

A compensation of this measuring error is effected by the apparatus of the present invention by means of elements which are not fixedly connected with the reading device and which do not participate in the inclination of the carriage, so that their relative position to the reading device is changed in case of an inclination of the carriage. In order to effect a compensation of the measuring error it is necessary for the compensating elements, having changed their relative position to the reading device, to cause a displacement of the image of the reading mark on the scale by the amount of $\Delta m$.

The compensating elements may cause either a deviation and/or a parallel displacement of the light rays. The change in position of the image of the reading mark is determined by the deviation of light rays and the parallel displacement of light rays caused by the inclination of the carriage and by the effect of the optical elements disposed between the compensating elements of the measuring scale.

If, now, the compensating element is disposed in the parallel path of light rays and if a change in position of the compensating element relative to the optical reading device results in a deviation of light rays $u$, then the displacement of the image of the reading mark is $f \cdot u$, $f$ being the focal length of the optical system provided between the compensating element and the scale. This follows from the well known optical formula $y = f \cdot tgu$, $y$ being the size of the image and $u$ being the angle of inclination of the light rays. Since the inclination of the carriage is always comparatively small, $u$ is also small and $tgu$ can be replaced by $u$.

It is also well known that $f$ can be replaced by $h/s'$, $s'$ being small. For a compensating element causing a deflection of light rays the displacement of the image of the reading mark is thus determined by the formula following from the above consideration:

$$\Delta m = \frac{du}{dw} \cdot \frac{h}{s'} \cdot w$$

$du/dw$ being the differential quotient of the deflection of light rays after the carriage has become inclined. The value $h/s'$ considers the effect of the next-following optical system and $w$ indicates the inclination of the carriage caused by the guide error. If a number of $n_1$ of such compensating elements is provided in the path of light rays, the effect of these various compensating elements must be summed up and the formula is obtained $$\Delta m = \sum_{i=1}^{n_1} \frac{du_i}{dw} \cdot \frac{h_i}{s'} \cdot w$$

If the compensating element merely displaces the light rays in parallel and if the compensating element is disposed between the measuring scale and the imaging optical system, then the displacement of the image of the reading mark is equal to the parallel displacement of the light rays, which can be represented by the formula $$\frac{dv}{dw} \cdot w = \Delta m$$

$dv/dw$ being the differential quotient of the parallel displacement of light rays relative to the inclination of the carriage and $w$ representing the inclination of the carriage. If an imaging optical system is provided between the compensating element and the measuring scale, its magnifying effect must be considered. It is well known that the lateral magnification of an optical system is equal to $s/s'$, $s'$ being the angle formed by a light ray emerging from a measuring point on the scale and the optical axis, and $s$ being the angle of this light ray in the image space. Herefrom follows that the displacement of the image of the reading mark is equal to $$\Delta m = \frac{dv}{dw} \cdot \frac{s}{s'} \cdot w$$

If a number of $n_2$ of such elements is provided, the individual effects of the same must be summed up and the following formula is obtained:

$$\Delta m = \sum_{k=1}^{n_2} \frac{dv_k}{dw} \cdot \frac{s_k}{s'} \cdot w$$

Where there are provided compensating elements with light rays deflecting and parallel displacing effects, both effects must be summed up and the general formula is obtained:

$$\Delta m = \sum_{i=1}^{n_1} \frac{du_i}{dw} \cdot \frac{h_i}{s'} \cdot w + \sum_{k=1}^{n_2} \frac{dv_k}{dw} \cdot \frac{s_k}{s'} \cdot w$$

which must become equal to $a \cdot w$ to get a compensating effect. $w$ can then be eliminated and thus the general formula of the invention is obtained $$\sum_{i=1}^{n_1} \frac{du_i}{dw} \cdot \frac{h_i}{s'} + \sum_{k=1}^{n_2} \frac{dv_k}{dw} \cdot \frac{s_k}{s'} = a$$

Figures 1, 2, 5:
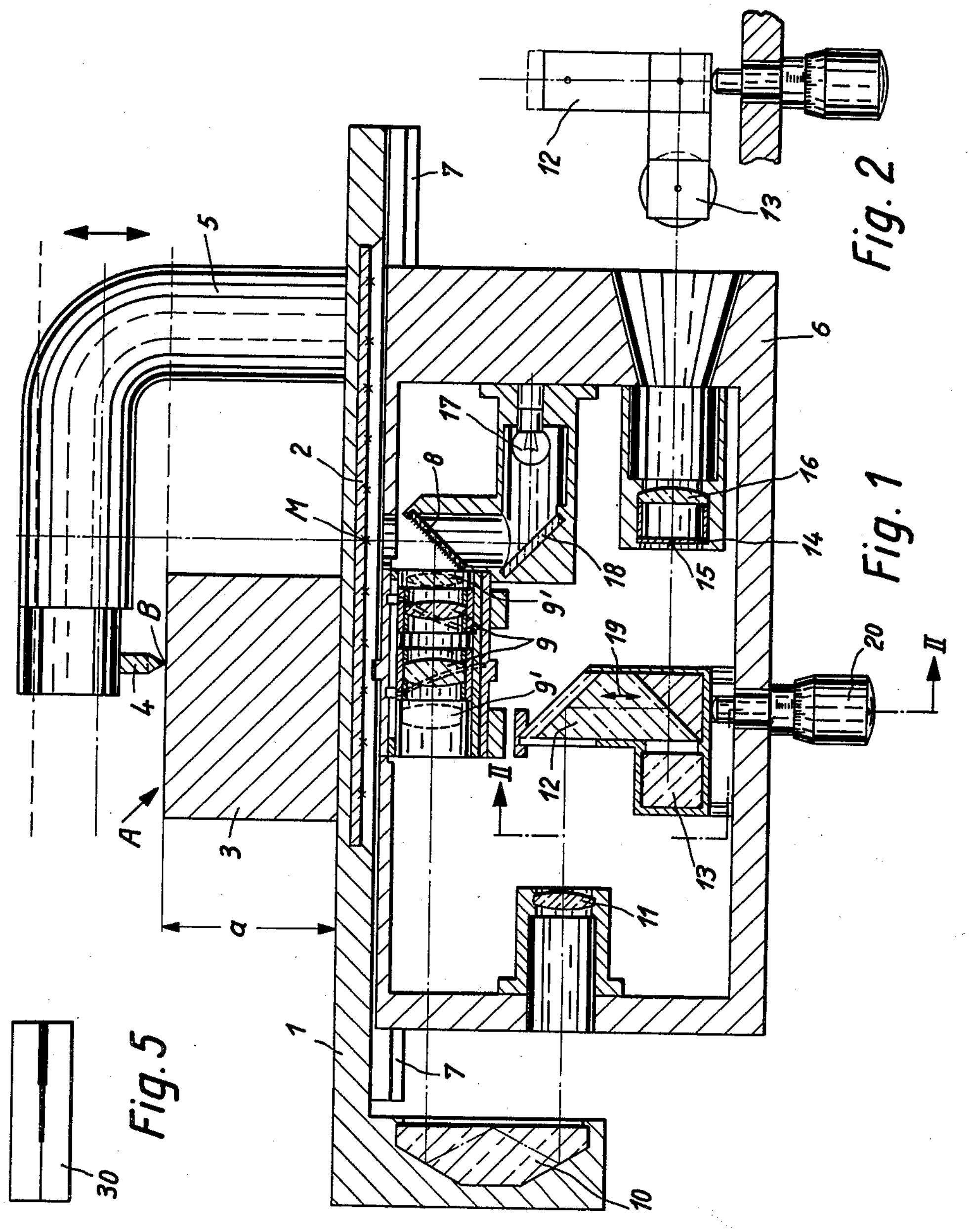
FIGURE 2 is a sectional view taken along lines II—II in FIGURE 1.
FIGURE 5 shows the refernce mark of the collimator in the apparatus shown in FIGURE 3.

The invention will next be descibed in greater detail, first with reference to FIGURE 1, showing a first embodiment of the invention, and wherein a scale 2 is fixedly mounted on a machine bed 1 of a machine tool.

The table of the machine tool supports a work piece 3 to be processed according to a coordinate system; for example a hole is to be drilled into work piece 3 at a point determined by two co-ordinates of a co-ordinate system. The drill 4 is mounted in a support 5 connected with a slide carriage 6, the latter being slidably disposed on a guide 7 longitudinally with respect to scale 2.

The reading device forming an image of measuring point M on graticule 14 is disposed on slide carriage 6. The reading device comprises a semi-transparent mirror 8 and an objective 9. The scale 2 is positioned in the plane extending through the focal point of objective 9. A prism 10 is fixedly connected with the machine bed and this prism 10 reflects three times the light rays arriving from objective 9. After leaving prism 10, the light rays are collected on graticule 14 by a lens 11. The graticule 14 bears a reading mark 15. Prisms 12 and 13 are provided between graticule 14 and lens 11. A micrometer screw 20 is provided for displacing prism 12 in the directions of double-headed arrow 19. Reading mark 15 can be viewed through magnifying lens 16. A light source 17 illuminates scale 2 via a mirror 18.

The afore-described embodiment operates in the following manner: Prism 12 is displaced by turning micrometer screw 20, if the measuring point M on scale 2 does not coincide with reference mark 15. The light rays passing through prism 12 are thus displaced in parallel. The displacement is continued until measuring point M coincides with reference mark 15 and the corresponding displacement value can be read from micrometer screw 20 indicating the fine measuring value. If carriage 6 is slightly tilted due to an inaccuracy of guide 7, for example by an angle $w$, the optical elements connected with the carriage execute the same tilting movements and in the same manner drill 4 is inclined. If it is assumed that the tilting occurs at point B, the image of reference point M does no longer coincide with reference point 15 on graticule 14, but is located at some other point, which would result in a measuring error. This error is, however, compensated by prism 10 which is fixedly connected with the machine bed and is, consequently, not tilted. The prism so deflects the light rays that the image of point M is placed at the accurate location on graticule 14, coinciding with reference point 15.

The following conditions must be observed, with reference to the above-mentioned formula in order to get a full and accurate compensating effect:

If the focal length of objective 9 is assumed to be $f$, then $f$ must be substituted for $h_1/s'$ in the general formula, since the compensating elements are provided in the parallel path of rays of the objective.

Since each mirror surface of prism 10 doubles the angle of inclination, $du_1/dw$ is equal to two, and since prism 10 has three such mirror surfaces, $n_1$ is equal to three. Two of the prism surfaces have the opposite optical effect, so that the sign of $h_1/s'$ has to be changed. The second term of the sum of the general formula can be neglected as there are no compensating elements effecting parallel displacement of the light rays. Consequently, $a=2f$ or, in other words, prism 10 compensates a guiding error accurately if the distance $a$ of the plane A of the surface of the work piece 3 from scale 2 is twice the focal length of the objective 9. It is thus possible to adapt the apparatus to various work pieces of different dimensions by changing correspondingly the focal length of objective 9.

This can be done by exchanging objective 9 for another objective having a different focal length. Preferably, however, and as shown in FIGURE 1, the objective consists of two lenses, each of which can be moved in a curved guide member from the position indicated by the bold lines into the position 9' as indicated by the dashed lines. Due to this displacement the focal length of objective 9 is changed. The displacement value can be read from a scale 22 calibrated in terms of various distances $a$.

Figure 4:
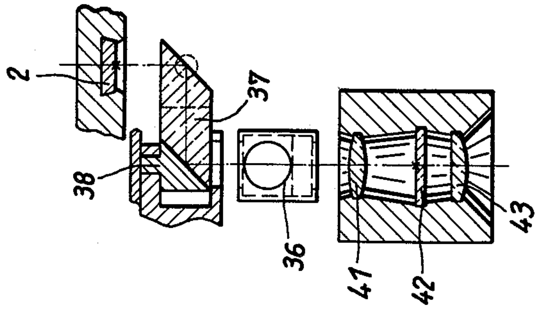
FIGURE 4 is a sectional view taken along lines IV—IV of FIGURE 3.
Figure 3:
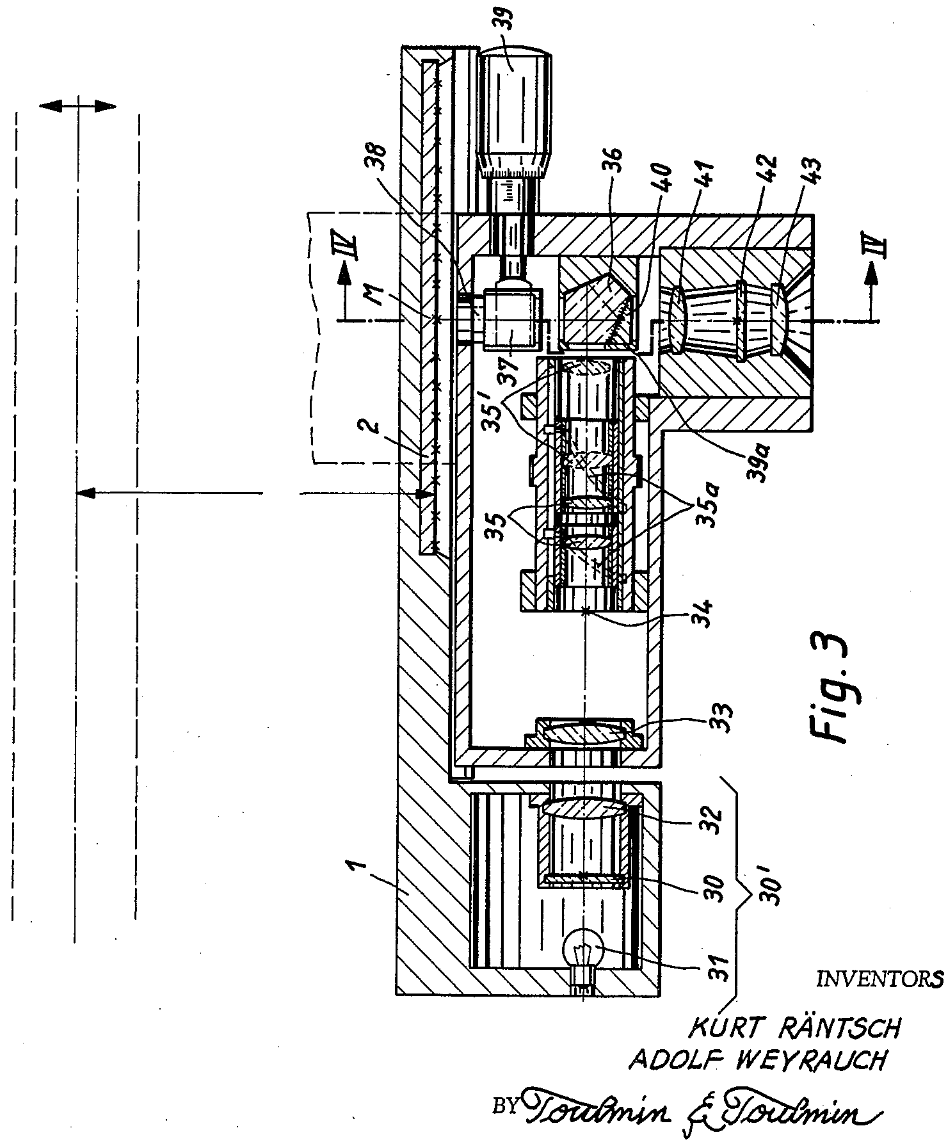
FIGURE 3 shows another embodiment of the invention for varying the quotient $h_i/s'$.

Another embodiment of the apparatus of the invention is shown in FIGURES 3 and 4, comprising, below scale 2 and on one and the same optical axis, light source 31, reference mark 30 and objective 32 of collimator 30', a collecting lens 33, and a two-lens objective 35, the latter being displaceable in curved guides 35a, and a pentaprism 36. Collimator 30' is fixedly connected with scale 2. Pentaprism 36 has a semi-transparent specular surface 39a on which a wedge 40 is attached. Above pentaprism 36 a prism 37 is hingedly provided, displaceable by micrometer screw 39 about axis 38, whereas a lens 41, graticule 42 and magnifying lens 43 are disposed below pentaprism 36.

The mark 30 of collimator 30' is illuminated by light source 31 and an image of the same is produced in infinity by the collimator objective 32. The light rays coming from objective 32 are collected by lens 33 in focal point 34. In the same point an image of mark 30 is produced by the two-lens objective 35 and via the pentaprism 36 and the prism 37 at point M on scale 2. If the image does not coincide with point M, the micrometer screw is turned and, consequently, prism 37 is pivoted about axis 38, until the image of mark 30 coincides with measuring point M on scale 2, micrometer screw 39 indicating the fine measuring value. The point M, for example an even stroke on scale 2, and the image of mark 30 coinciding therewith are projected on graticule 42 via the pentaprism 36, through the semi-transparent surface 39a and the wedge element 40, and through lens 41. Graticule 42 can be viewed through magnifying lens 43.

If the carriage 6 has become erroneously inclined by angle $w$, collimator 30', fixedly connected with scale 2, remains in its proper position. As a result, $du_1/dw$ is equal to one, so that $a$ is determined by the value of $h_1/s'$. This latter value is varied by displacing lenses 35 along their optical axis and varying their relative distance from each other, thereby changing the scale of reproduction of the image. Consequently, work distance $a$ is a function of magnification V of lenses 35.

If reference mark 30 is a stroke, the width of the image of the stroke varies if the magnification is changed. This can be compensated by providing a mark 30 of different widths as shown, for example, in FIGURE 5.

Figure 6:
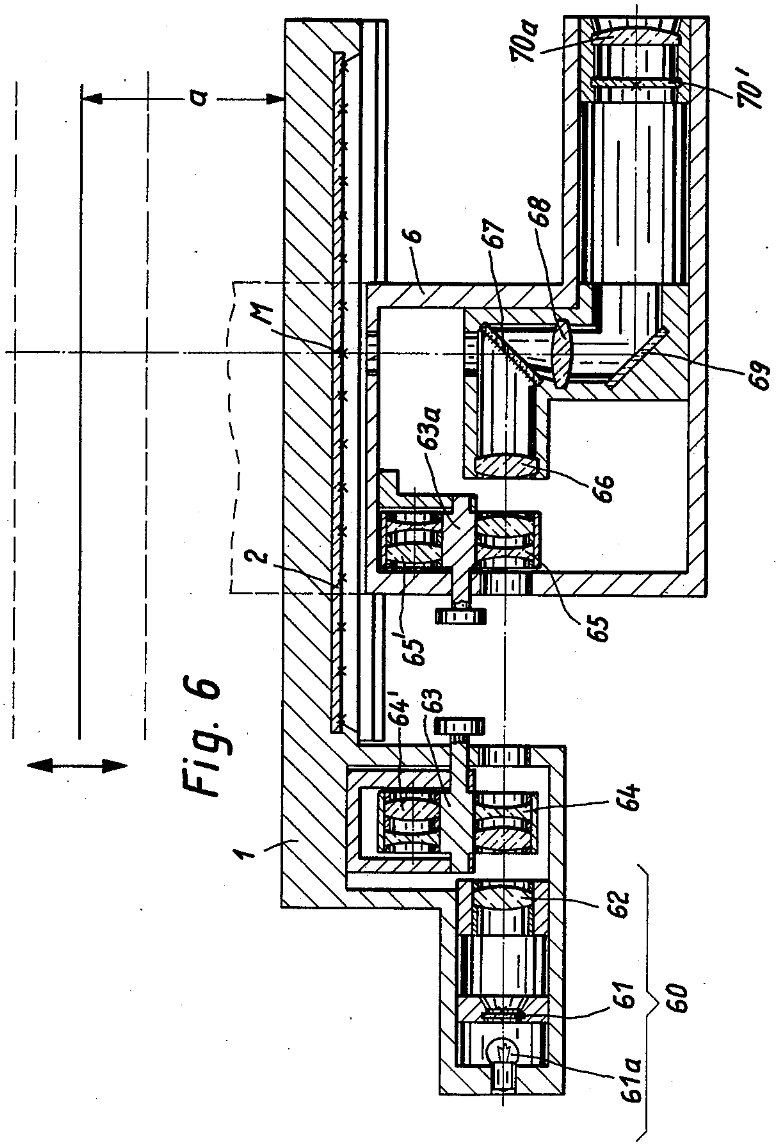
FIGURES 6 and 7 are schematic views of further embodiments for varying the quotient $h_i/s'$.

According to a further embodiment of the invention shown in FIGURE 6, a collimator 60 is again fixedly connected with scale 2. The collimator again comprises a light source 61a, a reference mark 61 and an objective 62. Furthermore, there are provided two magnifying systems, a first Galilean system 64, 64', mounted on a revolving element 63, and a second Galilean system 65, 65', mounted on a revolving element 63a. Furthermore, there is provided a collecting lens 66, a semi-transparent mirror 67, the latter vertically below point M, and, below the mirror, lens 68 and a further deflecting mirror 69, as well as a graticule 70' and a magnifying lens 70a.

The mark 61 of collimator 60 is projected to infinity by collimator objective 62. By rotating revolving element 63 one of the two Galilean systems 64, 64' can be brought into the path of rays of collimator 60. The same applies to the two Galilean systems 65 and 65' moved by revolving element 63a. The light rays leaving Galilean system 65 (or 65') pass through lens 66 and are reflected by the specular surface of the semi-transparent mirror 67 to scale 2. The image of reference mark 61 together with an image of point M on scale 2, are projected onto graticule 70' through lens 68 and mirror 69. The images can then be viewed through magnifying lens 70a.

In this example $$\frac{du_1}{dw}=1$$

and the work distance $a$ is a function of the magnification by Galilean systems 65 or 65'. The systems 64 and 64' are without influence on the amount of the work distance as they are already considered by quotient $du_1/dw$. Their only function resides in compensating the magnification of systems 65, 65' in such a manner that the total magnification of systems 64, 65 or 64', 65' is equal to one.

Figure 7:
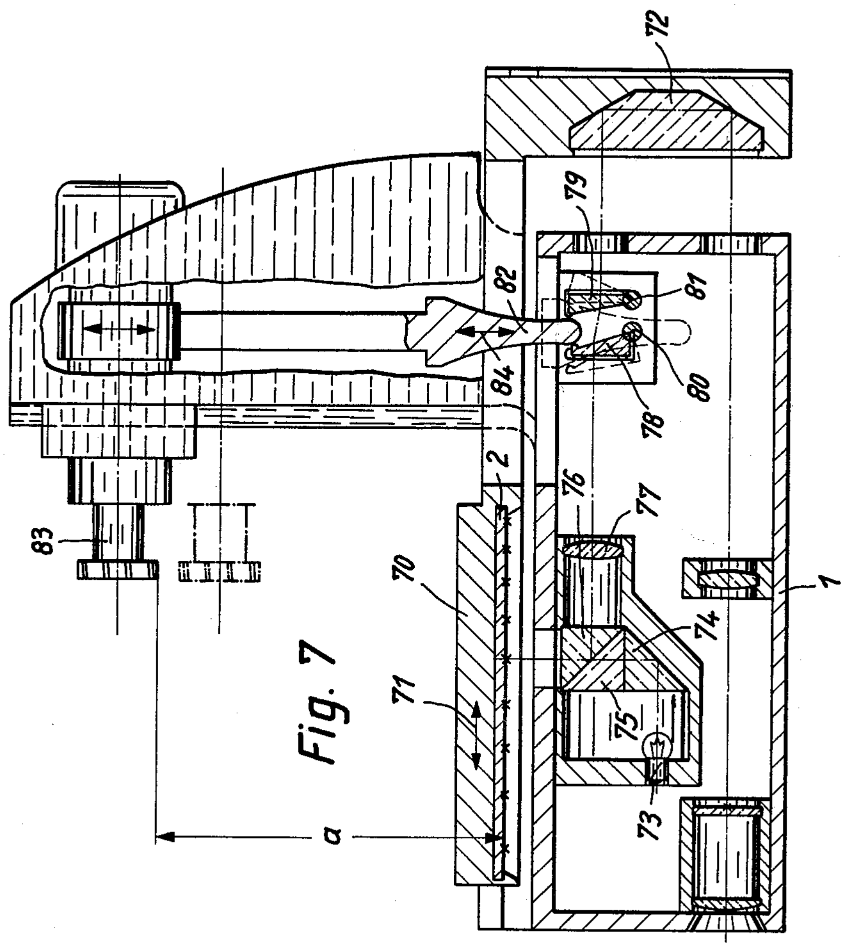

Still another embodiment of the invention is shown in FIGURE 7, showing portions of a tool machine wherein the work table 70 is displaceable in the directions of double-headed arrow 71. Scale 2 is mounted against the lower surface of work table 70. According to this embodiment of the invention the reading unit is fixedly mounted with the exception of prism 72, which latter is connected with work table 70 and is shaped and operates like prism 10 in the embodiment of FIGURE 1. Scale 2 is lighted by means of light source 73 via prisms 74 and 75, the latter having a specular semi-transparent surface in contact with another prism 76. Between prisms 76 and 72 glass wedge elements 78 and 79 are provided which are pivotable about shafts 80 and 81 and are controllable by means of a curved member 82 which latter is connected with the tool support 83. A parallel rectifying lens 77 is provided between system 76 and wedge portions 78, 79.

The light rays coming from point M on scale 2 are deflected by system 76 and are rectified in parallel by lens 77. The parallel light rays then pass through the wedge elements 78 and 79. These pivotable wedge elements 78 and 79 constitute an afocal system, that is, they change magnification without changing the parallel direction of the light rays. The degree of magnification depends on the inclinations of the wedge elements 78 and 79, their inclinations being controlled by curved element 82 in the following manner: If the tool support 83 is lowered or lifted in order to bring the tool in contact with the work piece, the curved element 82, which is connected with the tool support, is displaced correspondingly in the directions of the double-headed arrow 84 and causes a corresponding inclination of the wedge elements 78, 79. The curved portion of control element 82 is so shaped that the change of magnification exactly compensates a change of work distance $a$.

Figure 8:
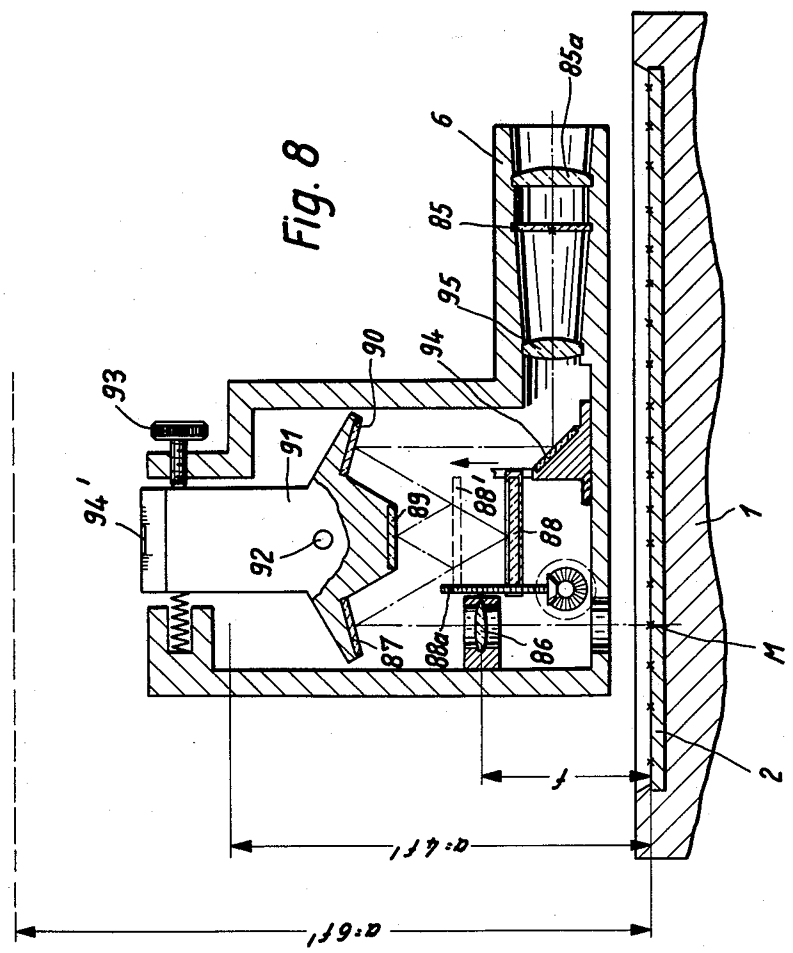
FIGURES 8 and 9 are embodiments of the invention for varying $n_1$.

Still a further embodiment is shown in FIGURE 8 wherein all optical elements used for producing an image of division stroke or point M on scale 2 in a graticule 85 are connected with slide carriage 6 and are displaceable therewith. The embodiment comprises above scale 2 an objective 86 having the focal length $f$. Behind objective 86 and in the path of rays of the latter or parallel thereto are provided four mirrors 87, 88, 89 and 90. The mirrors 87, 89 and 90 are mounted on a common support 91 which is pivotable about shaft 92 and which is displaceable by means of a micrometer screw 93. At its end opposite to the mirrors, support 91 bears a clinometer 94'. The fourth mirror 88 is disposed below mirror 89 and is connected with a spindle 88$a$, whereby it can be displaced vertically with respect to scale 2.

The division stroke or point M on scale 2 is projected to infinity by the objective 86. The light rays coming from objective 86 are then reflected by mirror 87 and further reflected in a manner depending on the respective position of mirror 88. This mirror can be displaced by spindle 88$a$ from the position indicated by the bold lines to a second position, indicated by the dashed lines and designated by numeral 88'. In the first position 88 the mirror reflects the light rays to mirror 90. In the second position 88' the light rays are first reflected to mirror 89, which latter reflects the light rays back to mirror 88 which then reflects the light rays to mirror 90. The light rays leaving mirror 90 pass via mirror 94 through objective 95 onto graticule 85, which latter can be viewed by magnifying lens 85$a$.

If slide carriage 6 becomes somewhat inclined during its displacement in its guide, all optical elements join this inclination so that an inaccurate division point or stroke is projected onto graticule 85. The inclination is indicated by a displacement of the bubble in clinometer 94'. Thereupon micrometer screw 93 is turned so as to displace support 91 about pivot 92 until the correct position is assumed as indicated by the bubble of clinometer 94'. The displacement, for example by an angle $w$, of support 91 is also carried out by the mirrors 87, 89 and 90 and each of these mirrors deflects the impinging light rays by twice the angle of incidence. Consequently, $$\frac{du_i}{dw}=2$$

for each mirror. Since the mirrors are disposed in the parallel path of light rays behind objective 86, $h_i/s'$ is equal to the focal length of objective 86$f$. Since in the lower position of mirror 88 two pivoting compensating elements become effective, more specifically the pivoting mirrors 87 and 90, $n_1=2$. In this position of mirror 88 $a=4f$. In the upper position of mirror 88, indicated by 88', three compensating elements, the mirrors 87, 89 and 90, become effective. In this position we obtain $n_1=3$ and $a=6f$.

Figure 9:
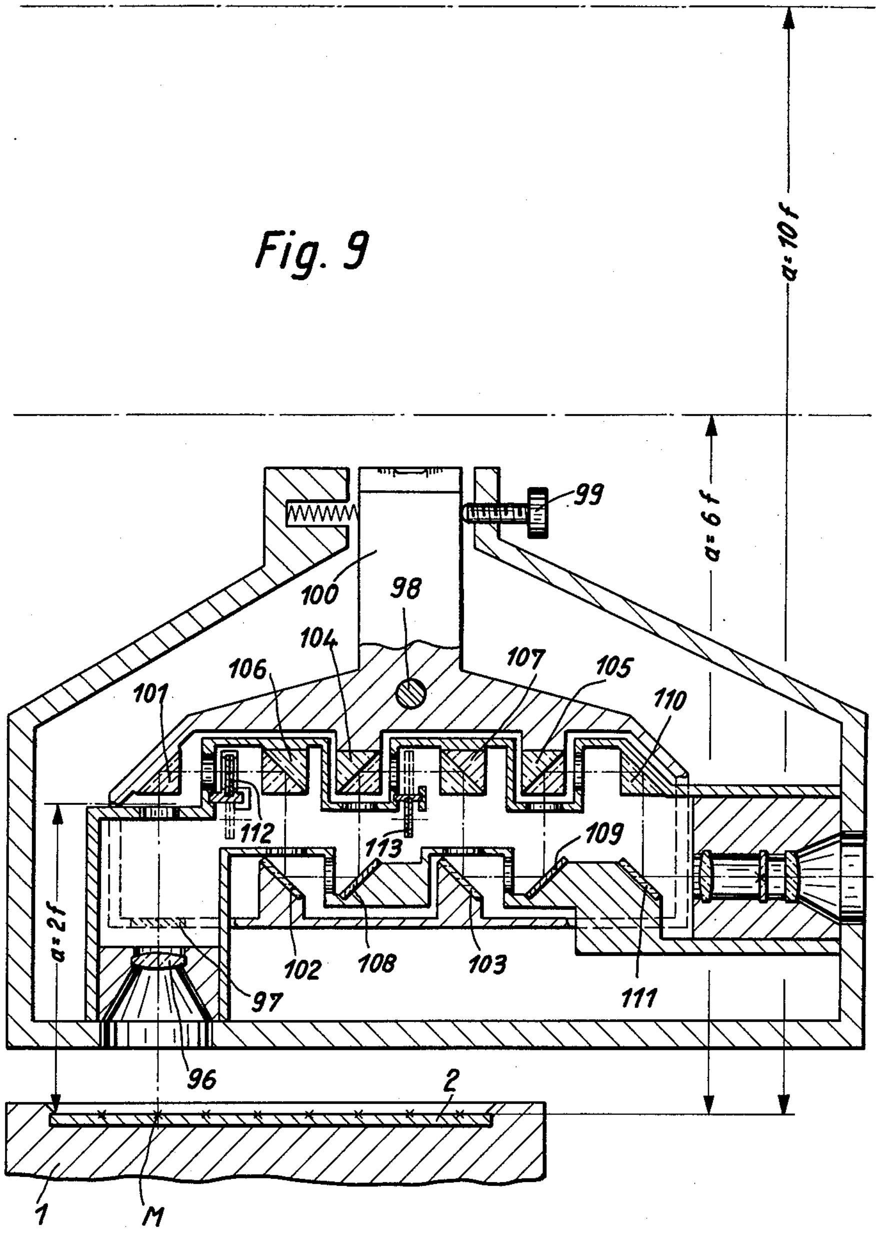

The embodiment shown in FIGURE 9 is similar to that of FIGURE 8, with the exception that the pivotable mirrors are replaced by pivotable polarizers allowing to pass the oscillatory component of light oscillating in one predetermined plane and blocking the component oscillating in a plane vertically relative to the passing component. The embodiment comprises the scale 2 and thereabove an objective 96 and a polarizer 97. A support 100 can be pivoted about shaft 98 and is displaceable by micrometer screw 99. The pivotable support 100 bears mirrors 101, 102, 103 and interference polarizers 104, 105. The slide carriage of the machine supports further interference polarizers 106 and 107 as well as mirrors 108, 109, 110 and 111. Half-wave length plates 112 and 113 are pivotably disposed before polarizers 106 and 107, respectively.

The light rays emanating from point M on scale 2 pass through objective 96 and through polarizer 97 producing linearly polarized light which then passes through the half-wave length plates 112, 113 turning the direction of oscillation of light rays by 90°. If it is assumed that all polarizers allow to pass the vertically oscillating component and reflect the parallel component the operation is as follows: Polarizer 97 produces linearly polarized light oscillating vertically relative to its plane of incidence. If the plates 112 and 113 have been pivoted so as to become removed from the path of rays, the light passes via mirror 101 unimpededly through the interference polarizers 106, 104, 107 and 105 and is then deflected by the mirrors 110 and 111 until one pivotably mounted compensating mirror becomes effective, which is mirror 101. This mirror reflects the light rays by twice the angle of incidence and, hence, $$\frac{du_i}{dw}=2$$

since the mirrors are located in the parallel path of light rays of objective 96, $$\frac{h_i}{s'}=f$$

$f$ being the focal length of objective 96. Hence, the work distance $a$ is $2f$. If now plate 113 is displaced into the path of rays, the direction of oscillation of the light rays is turned by 90° and the light rays leaving polarizer 104 are reflected by polarizer 107, impinging upon mirror 103, mirror 109, are reflected by polarizer 105, and then reach mirror 110. In this case the pivoting elements 101, 103 and 105 become effective; with other words, $n_1=3$ and, hence, $a=6f$. If, on the other hand, plate 112 is moved into the path of rays the light is reflected by polarizers 106, 104, 107 and 105. In this case five compensating elements become effective, that is the polarizers and mirrors 101, 102, 104, 103 and 105, respectively. Hence, $n_1=5$ and work distance $a=10f$.

Another embodiment is shown in FIGRE 10 comprising scale 2, an objective 115 and, on the same optical axis with the latter, a prism 116, graticule 120 and magnifying lens 120*a*. Transversely relative to the last-mentioned optical axis a first prism 117 is rotatably mounted on a shaft 119' which is connected with scale 2. Opposite to prism 117 prism 118 is rotatably mounted on shaft 120', which latter is connected with slide carriage 6. A lens 119 is disposed between prism 116 and prism 118.

The light rays from scale 2 are projected by objective 115 to infinity and are then directed by prism 116 to prism 117. Prism 117 deflects the light rays by 180°, whereupon they reach prism 118 which reflects them through lens 119. Thereafter they are directed by the specular surface of prism 116 to graticule 120 where the image can be viewed by magnifying lens 120*a*.

If now the prism 117 is turned by an angle *b*, then the deflection of light rays is $$\frac{du_i}{dw}=2\sin^2 b$$

Figure 10:
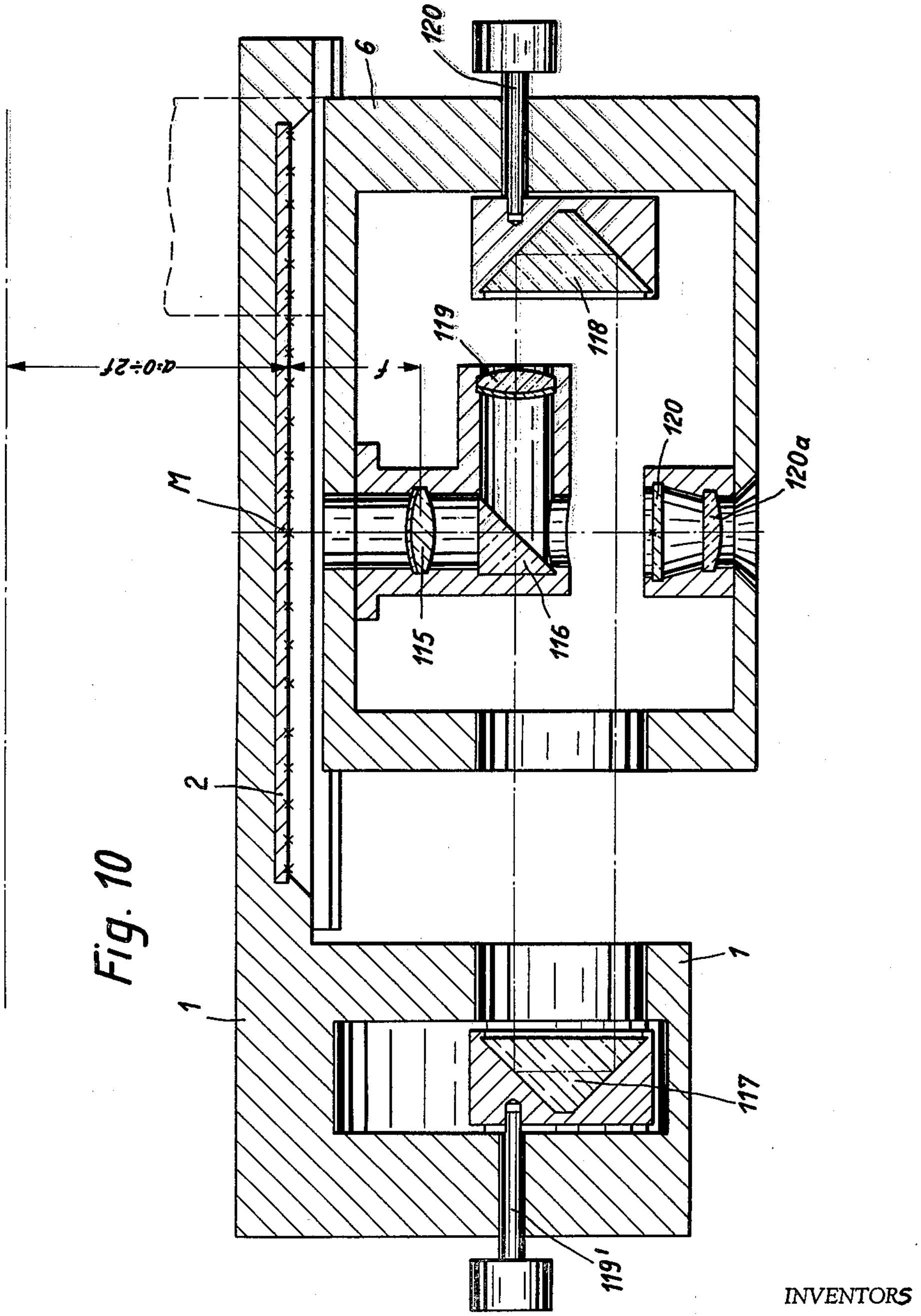
FIGURE 10 is an embodiment of the invention for varying $du_i/dw$.

The last-mentioned equation is obtained as follows: The surface normals of the reflecting surfaces of the compensating elements are:

$$o_1=\sqrt{1/2}\,(i+j)$$

and $$o_2=\sqrt{1/2}\,(i-j)$$

if it is assumed that the scale is disposed in the direction of the *i*-axis, and the *j*-axis is disposed in the plane of the drawing of FIGURE 10. The rotation about angle *b* can be mathematically described by the rotation matrix $$D_1=\begin{pmatrix}1 & 0 & 0\\ 0 & \cos b & -\sin b\\ 0 & \sin b & \cos b\end{pmatrix}$$

and the inclination of the carriage by the angle *w* can be mathematically described by the rotation matrix $$D_2=\begin{pmatrix}\cos w & -\sin w & 0\\ \sin w & \cos w & 0\\ 0 & 0 & 1\end{pmatrix}$$

The surfaces normals after rotation follow from the matrix products $$\tilde{o}_1=D_2D_1o_1$$

and $$\tilde{o}_2=D_2D_1o_2$$

The direction of the reflected light can be ascertained by the quaternionic product $$s'=\tilde{o}_2^{-1}\tilde{o}_1^{-1}s\tilde{o}_1\tilde{o}_2$$

wherein *s* is the vector of the incident light and *s'* is the emergent light. By the computation of the product it is obtained that the angle between the incident light and the projection of the emerging light in the plane *ij* is $u=2w\cdot\sin^2 b$, wherefrom we obtain $$\frac{du}{dw}=2\sin^2 b$$

Consequently, $a=2f\cdot\sin^2 b$, *f* being the focal length of objective 115. If *b* is equal to zero, as shown in the drawing, the work distance *a* is also zero. If, on the other hand, the angle *b* is 90°, then the work distance $a=2f$. The turning of prism 118 is without influence on the work distance and this prism is merely used for erecting the image.

Figure 11:
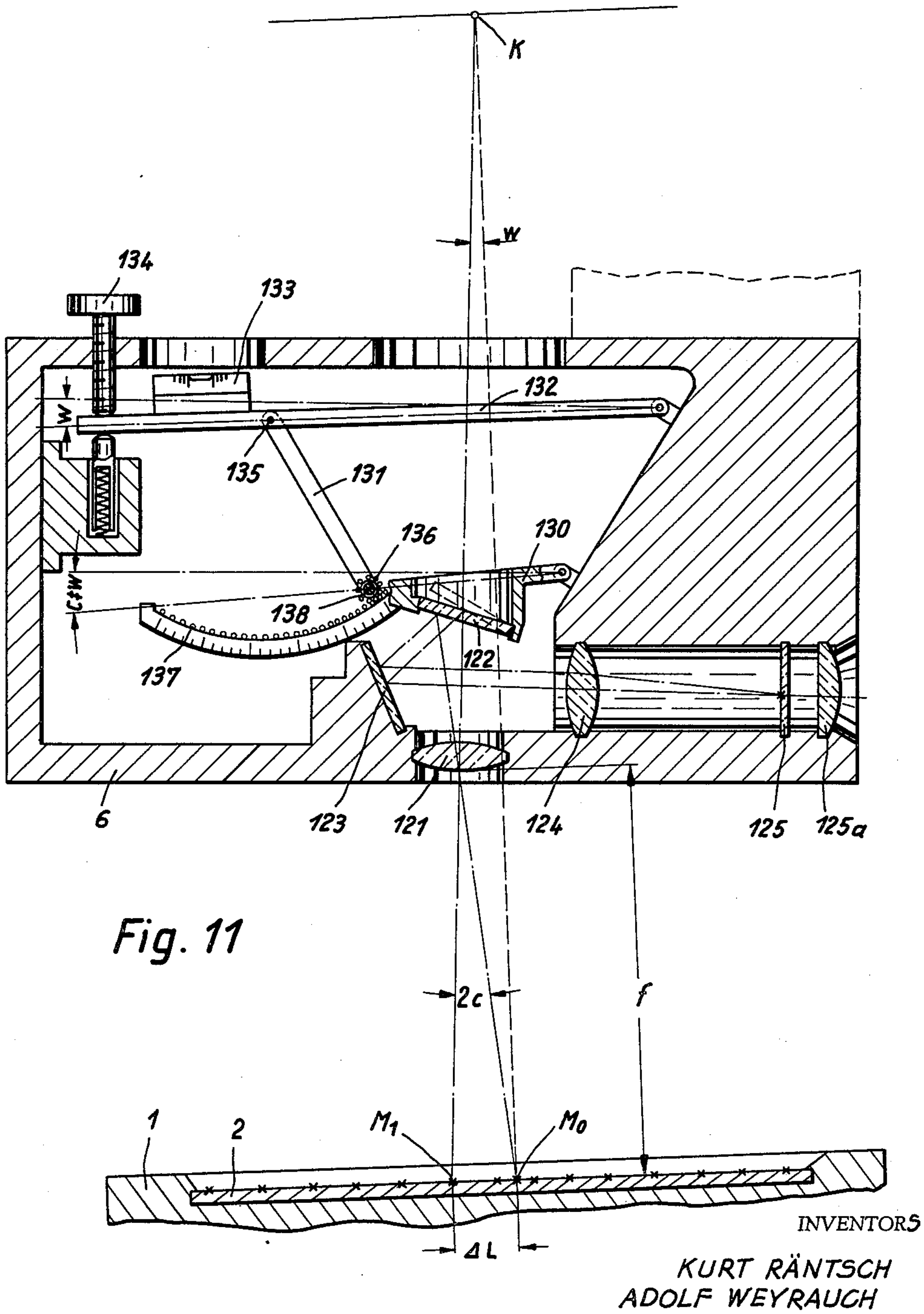
FIGURES 11 and 12 show further embodiments for varying $du_i/dw$.

In the embodiment of FIGURE 11, objective 121 is disposed above scale 2 and a displaceable mirror 122 is provided above objective 121. Mirror 122 is mounted on the lever arm 130 of an articulated quadrilateral structure 130, 131 and 132 attached to slide carriage 6.

The uppermost arm 132 supports clinometer 133 with which the normal position of the articulated frame structure can be controlled. Arm 132 can be displaced in order to re-establish the normal position by micrometer screw 134, positioned in slide carriage 6. Arm 131 is pivotable about pivot 135 at one end and bears, at the opposite end, a gear 136 meshing with the rack portion 137 forming an extension of lever arm 130. The lever arm 131 can be pivoted about pivot 135 with gear 136 travelling along rack 137, thereby varying the effective length of lever arm 130. The screw 138 is provided for arresting arm 131 in any desired position.

The light rays from scale 2 pass through objective 121 and are reflected by mirror 122 onto mirror 123, whereupon they pass through lens 124 and reach graticule 125, an image of which can be viewed by magnifying lens 125*a*. If the slide carriage 6 has become inclined by an angle *w*, due to an inaccuracy of the guide means of the carriage, the arm 132 of the quadrilateral articulated structure is inclined accordingly; the inclination can be determined by the displacement of bubble of clinometer 133. If now micrometer screw 134 is turned, lever arm 132 is displaced and this is continued until the accurate horizontal position thereof has been reestablished, which can be controlled by clinometer 133. At the end of this operation lever arm 132 has travelled by an angle *c* and mirror 122 has been displaced by the same angular distance.

The quadrilateral articulated structure results in the fact that lever arm 130 performs another angular movement than lever arm 132. The transmission ratio $c/w$ can be changed by varying the shape of the quadrilateral structure by displacing arm 131. If the carriage is inclined by an angle *w*, mirror 122 is tilted by the angle $$\frac{c}{w}\cdot w$$

and this results in a deflection of light rays by twice this angle or $$2\cdot\frac{c}{w}\cdot w$$

From this $$\frac{du}{dw}=2\cdot\frac{c}{u}$$

is obtained. Hence, in the general formula, supra, the value $du_i/dw$ can be replaced by the value $$2\cdot\frac{c}{u}$$

The work distance *a* is thus $$2f\cdot\frac{c}{w}$$

In the general formula, supra, $$\frac{du_i}{dw}=2\frac{c}{w}$$

the ratio $c/w$ can be adjusted by displacing arm 131.

Figure 12:
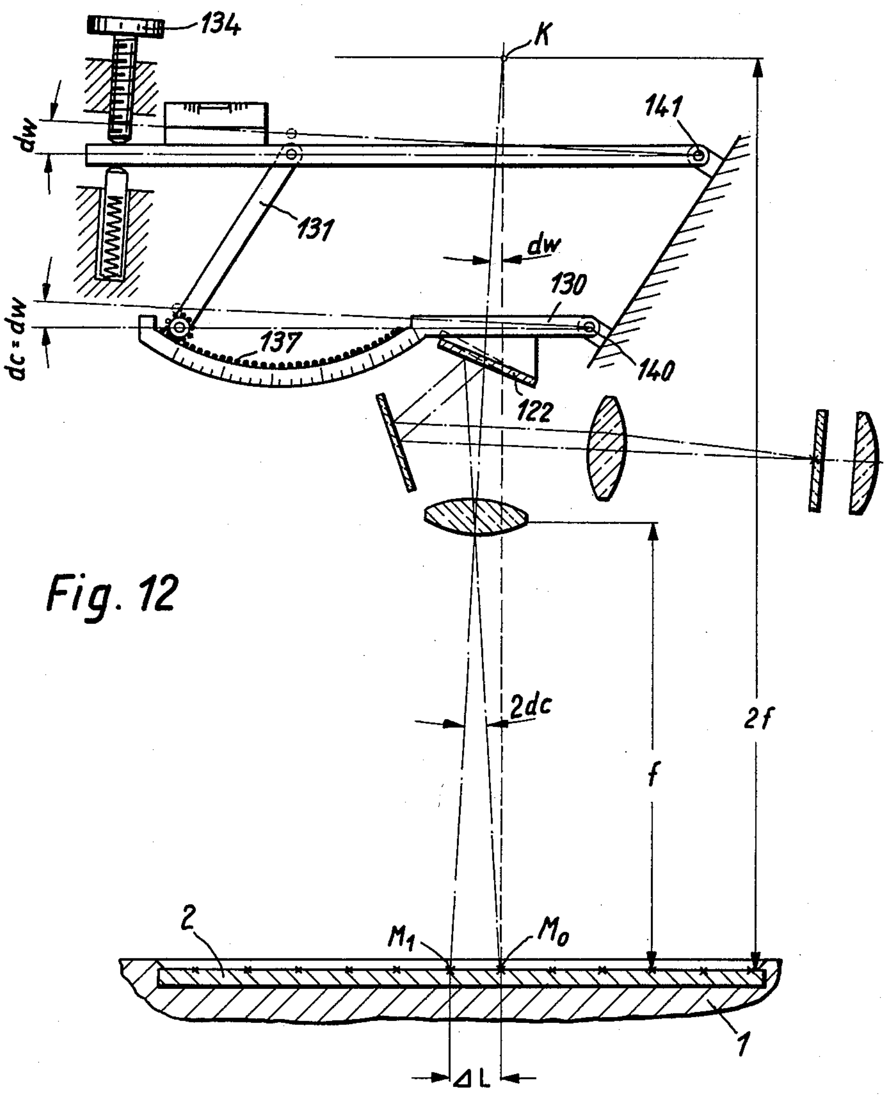

FIGURE 12 shows the articulated quadrilateral structure of FIGURE 11 in a position where arm 131 has travelled with its gear on rack 137 so that a parallelogram is formed. If now slide carriage 6 becomes tilted by an angle *w* and lever arm 132 is readjusted by micrometer screw 134, the arm 130 is also displaced by the angle *w*. The same applies to mirror 122. Consequently, $$\frac{du_i}{dw}=2$$

and $a=2f$.

In the embodiment of FIGURE 13 a rectangular prism 142 is mounted in a support 142*a*, the latter being pivotably positioned on pivot 145 in such a manner, that it swings like a pendulum.

Figure 13A:
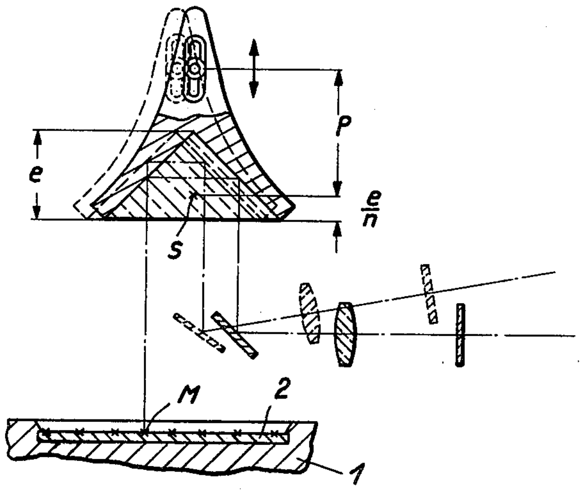

The light rays coming from the point M on scale 2 are deflected by prism 142 by 180°, pass through objective 143 and are reflected by mirror 143a onto graticule 144. If the slide carriage becomes inclined by an angle $w$, the prism 145 is displaced parallel relative to itself, but retains its vertical position, as will be seen from the position of prism 145 in FIGURE 13*a*. The light rays through prism 142 are thus displaced parallel relative to their previous positions.

The distance of the parallel displacement depends on the length of the pendulum P which length is measured between point S and pivot 145, S being located vertically below pivot 145 and having, from the basic surface of prism 142, the distance $e/n$, $e$ being the height of prism 142. The last-mentioned equation follows from these considerations: Point S is characterized in that from this point the distances between the incident light rays and the light rays emerging parallel to the incident light are oppositely equal, that is a displacement of point S results in twice the displacement of light rays, which can be expressed by the formula $v_k=2pw$, if the displacement of point S is $pw$. Herefrom follows that $v_k=2pw$.

In the general formula, supra, $dv_k/dw$ becomes $2p$. Since, furthermore, $$\frac{S_k}{s'}=1$$

$a$ becomes equal to $2p$. The compensating distance is changed by varying the pendulum length $p$. This embodiment does not have compensating elements and, consequently, the first term of the sum in the general formula is zero.

Figure 14:
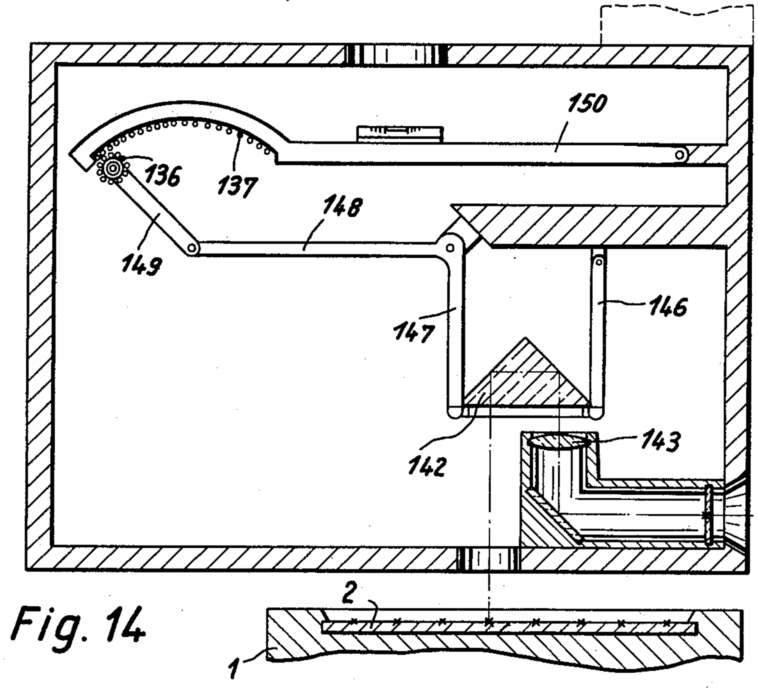

In the embodiment of FIGURE 14 the prism 142 is suspended on an articulated parallelogram structure comprising the articulated lever arms 146, 147. Arm 147 is connected with an articulated portion 148 of articulated quadrilateral structure comprising arms 148, 149, 150. Arm 149 has gear 136, as shown in FIGURE 11, meshing with rack 137. The effective length of arm 150 can be varied as has been described in connection with the embodiment of FIGURE 11. It will be apparent that in this embodiment the pendulum length is constants; the lever 147 can be inclined by $c$, whereby it is possible to change the transmission ratio $c/w$ of the articulated quadrilateral structure 150.

The factor $2p$ and the ratio $c/w$ are already considered in the value $dv_k/dw$ and, consequently, the work distance $$a=2p\cdot\frac{c}{w}$$

It will be understood that this invention is suceptible to modification in order to adapt it to different usages and conditions and, accordingly, it is desired to comprehend such modifications within this invention as may fall within the scope of the appended claims.

What we claim is:

1. Optical apparatus for accurately adjusting and reading the displacement of slide carriages in apparatus comprising: a stationary portion and a moveable portion, a measuring scale and a reading device having a graticule provided in said stationary and said moveable portions, respectively, optical means including at least one optical element for projecting a section of said measuring scale on said graticule of said reading device, and optical correction means including at least one optical element compensating errors appearing in said reading device caused by guide errors resulting in a tilting of said slide carriage, with the optical means in the apparatus meeting the requirements of the equation $$\sum_{i=1}^{n}\frac{du_i}{dw}\cdot\frac{h_i}{s'}+\sum_{k=1}^{n_2}\frac{dv_k}{dw}\cdot\frac{s_k}{s'}=a$$

wherein $a$ designates the variable distance between said measuring scale and the measuring plane; $du_i$ is the deflection of the light rays caused by the $i^{th}$ compensating element of said compensating means at an inclination of said slide carriage by the angle $w$; $h_i$ is the distance between a light ray leaving the $i^{th}$ compensating element of said compensating means and the optical axis; $s'$ is the angle formed by this light ray with the optical axis after the light ray leaves said optical projecting means subsequent to the $i^{th}$ element of said compensating means; $dv_k$ designates the parallel displacement of a light ray relative to itself caused by the $k^{th}$ compensating element of said compensating means with an inclination of said slide carriage by the angle $w$; $s_k$ is the angle formed between the light ray leaving the $k^{th}$ compensating element of said compensating means and the optical axis; $n_1$ is the number of the compensating elements of said compensating means deflecting the light ray from its previous direction; $n_2$ is the number of the compensating elements of said compensating means displacing a light ray parallel relative to itself, and adjustment means for varying at least one of the values $du_i/dw$; $h_i/s'$; $dv_k/dw$; $s_k/s'$; $n_1$; $n_2$.

2. Optical apparatus according to claim 1, comprising an objective of variable focal lengths projecting the section of said scale to infinity, constituting means for varying the value $h_i/s'$.

3. Optical apparatus according to claim 1, comprising an objective of variable focal lengths projecting the section of said scale to infinity and consisting of a pair of lenses adjustable with respect to their relative distance from one another, constituting means for varying the value $h_i/s'$.

4. Optical apparatus according to claim 1, comprising means for varying the magnification of the projected section of said measuring scale, thereby varying the value $h_i/s'$.

5. Optical apparatus according to claim 1, comprising a collimator fixedly connected with said scale and having a collimator mark, an image of which is superimposed by said optical projecting means to the image of the section of said measuring scale, and an objective of variable focal lengths projecting the section at said scale to infinity and consisting of a pair of lenses adjustable with respect to their relative distance from one another, constituting means for varying the value $h_i/s'$.

6. Optical apparatus according to claim 1, comprising a collimator fixedly connected with said scale and having a collimator mark, an image of which is superimposed by said optical projecting means to the image of the section of said measuring scale, and a pair of displaceable lenses in the imaging path of rays of said collimator mark, said lenses being adjustable with respect to the relative distance from each other.

7. Optical apparatus according to claim 5, comprising at least two Galilean systems of different magnifying power, and means for moving the same into and out of the imaging path of rays of said collimator mark.

8. Optical apparatus according to claim 5, comprising at least two Galilean systems of different magnifying power, and means for moving the same into and out of the imaging path of rays of said collimator mark, and, disposed behind said collimator in the stationary portion of the apparatus, at least two further Galilean systems of different magnifying power.

9. Optical apparatus according to claim 5*t*, said collimator mark being a linear mark of varying widths.

10. Optical apparatus according to claim 4, comprising, in the imaging path of rays of the section of said measuring scale, a pair of prisms pivotable about an axis normal to the optical axis and spaced from one another by 180°.

11. Optical apparatus according to claim 4, comprising, in the imaging path of rays of the section of said measuring scale, a pair of prisms pivotable about an axis normal to the optical axis and spaced from one another by 180° and curved disk means controlling the pivoting motion of said prisms.

12. Optical apparatus according to claim 1, comprising a plurality of pivotable plane mirrors and a stationary mirror, disposed behind said optical projecting means in the parallel path of light rays imaging the section of said measuring scale and arranged in alternating succession of a pivotable mirror and a stationary mirror, and means for directing the path of light rays via any desired number of said pivotable mirrors, thereby varying the value $n_1$.

13. Optical apparatus according to claim 1, comprising a plurality of pivotable plane mirrors and a stationary mirror, disposed behind said optical projecting means in the parallel path of light rays imaging the section of said measuring scale and arranged in alternating succession of a pivotable mirror and a stationary mirror, pivotable support means for mounting said pivotable mirrors in the fashion of a pendulum, and means for directing the path of light rays via any desired number of said pivotable mirrors, thereby varying the value $n_1$.

14. Optical apparatus according to claim 1, comprising a pivotable support body, a first, a second and a third pivotable mirror mounted on said pivotable support body and disposed behind said optical projecting means in the parallel path of light rays imaging the section of said measuring scale, and a fourth, non-pivotable, height-adjustable mirror, adjustable to a first and a second position, in the first position whereof the light rays are reflected from said first mirror directly to said fourth mirror then to the third mirror, whereas in the second position the light rays are reflected from said first mirror to said second mirror, fom the latter to said fourth mirror and from the latter to said third mirror, thus vaying the value $n_1$.

15. Optical apparatus according to claim 12 comprising a plurality of polarization filters replacing a predetermined number of said pivotable and stationary mirrors and adapted to reflect the oscillatory light component of the imaging light rays oscillating vertically relative to the direction of incidence, and allowing to pass the oscillatory light component oscillating parallel relative to the direction of incidence, means for linearly polarizing the imaging light rays and a plurality of pivotable half-wave length plates pivotably into and out of the path of light rays and associated with said polarization filters.

16. Optical apparatus according to claim 1, comprising means for varying the value $du_l/dw$ consisting of a pair of prisms rectangularly pivotable about an axis parallel to the direction of the incident imaging light rays, one being provided on said measuring scale and the other being provided on said slide carriage.

17. Optical apparatus according to claim 1, comprising an articulated quadrilateral structure having a length-adjustable arm and a mirror mounted on said quadrilateral structure behind said optical projecting means in the parallel path of imaging light rays.

18. Optical apparatus according to claim 1, comprising an articulated quadrilateral structure having a length-adjustable arm, a clinometer and a micrometer screw on said arm for adjusting the same and a mirror mounted on said quadrilateral structure behind said optical projecting means in the parallel path of imaging light rays.

19. Optical apparatus according to claim 1, a pivoting support pendulum body of adjustable pendulum length and a rectangular prism mounted in said body and disposed in the imaging path of light rays, constituting means for varying the value $dv_k/dw$.

20. Optical apparatus according to claim 1, comprising, for changing the value $dv_k/dw$, a parallelogram guide, a rectangular prism suspended from said parallelogram guide and disposed in the imaging path of light rays, a quadrilateral articulated structure having length-adjustable arms and fixedly connected with said parallelogram guide.

21. Optical apparatus for accurately adjusting and reading the displacement of a first member relative to a second member with stationary measuring scale, with a reading apparatus for the scale being mounted on said first member, the combination comprising: an objective lens member and an eye piece in said first member, there being an optical path extending from said scale through said lens member to said eye piece; a correcting member tiltable with respect to said first member and including at least two light deflecting surfaces and being disposed in said light path and producing an angular deflection $du$ and a parallel deflection $dv$ upon relative tilting of said first and second member by an angle $dw$; means for determining the distance $a$ of a working plane from said scale wherein $$a=\frac{du}{dw}\cdot\frac{h}{s'}+\frac{dv}{dw}\cdot\frac{s}{s'}$$

with $h$ determining the distance and $s$ the angle of a ray leaving said correcting member with respect to the optical axis thereof, and $s'$ being the angular deflection of that ray produced by said objective lens member; and means for adjustably varying any of said $du/dw$, $dv/dw$, $h/s'$, $s/s'$.

22. Optical apparatus for accurately adjusting and reading the displacement of a first member relative to a second member with stationary measuring scale, with a reading apparatus mounted on said first member, the combination comprising: optical scale-observing means having a predetermined optical magnification and including an objective member mounted on said first member at focal distance from said scale and defining an image-side optical axis; at least one, tiltably disposed, reflecting surface positioned at the image side of said scale-observing means, being traversed by said axis, receiving parallel rays therefrom, and producing a deflection of an angle $du$ upon a tilting between said first and said second member, by angle $dw$; an eye piece disposed to observe the light rays from said reflecting surface; means for determining the distance $a$ of a working plane from said scale wherein $$a=\frac{du}{dw}\cdot\frac{h}{s'}+\frac{du}{dw}\cdot\frac{s}{s'}$$

with $h$ determining the distance and $s$ the angle, of a ray leaving said correcting member with respect to the optical axis thereof, and $s'$ being the angular deflection of that ray produced by said objective lens member.

23. Optical apparatus for accurately adjusting and reading the displacement of a first member relative to a second member with stationary measuring scale, with a reading apparatus mounted on said first member, the combination comprising: a light source; an eye piece and an objective member mounted on said first member; optical means defining a light path from said light source, via said scale, said objective member to said eye piece and including, means tiltable subjecting a portion of the optical axis of said light path to an angular deflection $du$ with $du/dw$ defining the alteration of said deflection upon a relative tilting of said first and said second member by the angle $dw$, further including adjustable means defining a variable magnification within said light path; and means determining a working plane at a distance $a$ from said scale with $a$ being equal to $$\frac{du}{dw}\cdot\frac{h}{s'}+\frac{du}{dw}\cdot\frac{s}{s'}$$

with $h$ being the distance of a light ray from said portion of the optical axis, and $s'$ being the angular deflection of that ray as produced by said variable magnification means.

24. Optical apparatus for accurately adjusting and reading the displacement of a first member relative to a second member with stationary measuring scale, with a reading apparatus mounted on said first member, the combination comprising: an objective lens assembly mounted on said first member at focal distance from said scale, said lens assembly including variable elements for adjusting one of said focal length and the magnification of said lens assembly; optical reflection means including at least two reflecting surfaces, including a first and a last reflecting surface and being mounted on said second member and having the first reflecting surface on the image side of said objective, and reflecting light therefrom successively by means of its reflecting surfaces; an eye piece in said first member receiving light from said last reflecting surface; and means on said base for determining the distance $a$ between said scale and a working plane to equal $$\frac{du}{dw}\cdot\frac{h}{s'}+\frac{du}{dw}\cdot\frac{s}{s'}$$

with $h$ determining the distance and $s$ the angle, of a ray leaving said correcting member with respect to the optical axis thereof, and $s'$ being the angular deflection of that ray produced by said objective lens member.

References Cited in the file of this patent

UNITED STATES PATENTS 2,368,434 Turrettini ---------------- Jan. 30, 1945
2,474,602 Turrettini ---------------- June 28, 1949

FOREIGN PATENTS 932,037 Germany ---------------- Aug. 22, 1955
1,024,252 Germany ---------------- Feb. 13, 1958